United States Patent [19]

Cohen et al.

[11] Patent Number: 4,691,990
[45] Date of Patent: Sep. 8, 1987

[54] OPTICAL FIBER WITH DEPRESSED INDEX OUTER CLADDING

[75] Inventors: Leonard G. Cohen, Berkeley Heights; David W. Johnson, Jr., Pluckemin; John B. MacChesney, Lebanon, all of N.J.

[73] Assignee: American Telephone and Telegraph Company, AT&T Bell Laboratories, Murray Hill, N.J.

[21] Appl. No.: 670,280

[22] Filed: Nov. 13, 1984

[51] Int. Cl.⁴ .................................................. G02B 6/22
[52] U.S. Cl. ............................... 350/96.33; 350/96.34
[58] Field of Search ............... 350/96.29, 96.30, 96.33, 350/96.34

[56] References Cited

U.S. PATENT DOCUMENTS

| | | | |
|---|---|---|---|
| 4,372,647 | 2/1983 | Okamoto et al. | 350/96.33 |
| 4,372,648 | 2/1983 | Black | 350/96.33 |
| 4,385,802 | 5/1983 | Blaszyk et al. | 350/96.33 |
| 4,419,115 | 12/1983 | Johnson et al. | 65/3.12 |
| 4,426,129 | 1/1984 | Matsumura et al. | 350/96.33 |
| 4,435,040 | 3/1984 | Cohen et al. | 350/96.33 |
| 4,439,007 | 3/1984 | Lazay et al. | 350/96.30 |
| 4,447,127 | 5/1984 | Cohen et al. | 350/96.33 |

OTHER PUBLICATIONS

*Proceedings of the IEEE*, vol. 68, No. 10, Oct. 1980, "Materials and Processes for Preform Fabrication—Modified Chemical Vapor Deposition and Plasma Chemical Vapor Deposition", pp. 1181–1183, by J. B. MacChesney.
*Proceedings of the IEEE*, vol. 68, No. 10, Oct. 1980, "Materials and Processes for Fiber Preform Fabrication—Vapor-Phase Axial Deposition", pp. 1184–1187, by T. Izawa et al.
*Proceedings of the IEEE*, vol. 68, No. 10, Oct. 1980, "Fabrication of Optical Waveguides by the Outside Vapor Deposition Process", pp. 1187–1190, by P. C. Schultz.
*Proceedings of the IEEE*, vol. 69, No. 1, Jan. 1981, "Understanding Monomode Optical Fibers", pp. 6–13, by A. W. Snyder.
*Optical Fiber Telecommunications* by S. E. Miller et al., Academic Press, New York, pp. 37–62.
*Applied Optics*, vol. 22, No. 19, Oct. 1, 1983, "Refractive Index Dispersion and Related Properties in Fluorine Doped Silica" by J. W. Fleming et al., pp. 3102–3104.
*IEEE Journal of Quantum Electronics*, vol. QE-18, No. 10, Oct. 1982, "Radiating Leaky-Mode Losses in Single-Mode Lightguides with Depressed-Index Claddings", pp. 1467–1472, by L. G. Cohen et al.
*Journal of Non-Crystalline Solids* 63 (1984), "Sol-Gel Preparation of Transparent Silica Glass", pp. 155–161, by E. M. Rabinovich et al.

*Primary Examiner*—William L. Sikes
*Assistant Examiner*—Frank González
*Attorney, Agent, or Firm*—Eugen E. Pacher

[57] ABSTRACT

Single mode and multimode silica-based optical fibers having a down-doped outer cladding are disclosed. The outer cladding material is derived from a preexisting silica tube that comprises an amount of index-lowering dopant, typically F or B, sufficient to result in an effective refractive index of the material that is at least about 0.001, preferably at least 0.0025, lower than the refractive index of $SiO_2$. Single mode optical fiber according to the invention typically requires a smaller amount of deposited cladding material than an equivalent prior art fiber, and thus can be produced more economically. Multimode optical fiber according to the invention may have lower core doping or higher NA than equivalent prior art fiber. Down-doped substrate or sleeve tubes advantageously are produced by a gel process.

12 Claims, 8 Drawing Figures

OPTICAL FIBER WITH DEPRESSED INDEX OUTER CLADDING

FIELD OF THE INVENTION

This invention pertains to optical fiber with cladding.

BACKGROUND OF THE INVENTION

Optical fiber technology has been rapidly developing over the last few years. Fibers having loss below 1 dB per kilometer at a predetermined operating wavelength, and capable of transmission rates in excess of 10 gigabits kilometer per second at that wavelength are now routinely being produced. To achieve such operating characteristics, fabrication methods have been highly refined to minimize contamination, and fiber designs have been introduced that minimize such properties as scattering loss and dispersion.

Optical fibers typically comprise a central region, the core, having a refractive index that is greater than the refractive index of the material surrounding the core, usually referred to as the cladding. Both core and cladding generally comprise silica as a major constituent, typically comprising more than 80% b.w. $SiO_2$. The refractive index of silica is changed as required by means of doping with appropriate chemical elements. For instance, doping of silica with germania raises the refractive index, whereas doping with fluorine or boron results in index lowering. Optical fiber is generally produced by drawing from a so-called preform, a glass body produced by a process comprising deposition of in situ-formed glassy material onto a substrate.

In one category of preform manufacturing techniques, the so-called internal deposition techniques, the substrate is a preexisting silica tube, with the glassy material deposited onto the inside surface of the tube. See J. B. MacChesney, *Proceedings of the IEEE*, Vol. 68(10), 1980, pp. 1181–1183. In another category, to be referred to as "outside" deposition techniques, the deposition substrate typically is the outside of a mandrel or the endface of a starting silica rod. See T. Izawa and N. Inagaki, op. cit., pp. 1184–1187, and P. C. Schultz, op. cit., pp. 1187–1190.

For inside deposition processes, e.g., the Modified Chemical Vapor Deposition (MCVD) process, or the Plasma Chemical Vapor Deposition (PCVD) process, gaseous precursors (e.g., $SiCl_4$, $GeCl_4$), oxidants (typically $O_2$), and possibly diluents are introduced into the bore of a substrate tube, and a portion of the internal volume is heated, such as by means of an external heat source or a plasma. In the hot zone a chemical reaction takes place, resulting in formation of an amorphous deposit, which is consolidated into glass by heating of the substrate.

In outside deposition processes, e.g., the Vapor Axial Deposition (VAD) process or the Outside Vapor Deposition (OVD) process, the gaseous precursors are reacted in a flame, and the resulting amorphous reaction product deposited on the substrate. After completion of the deposition the deposited material is "dried" and sintered to a glass body. Frequently, a silica sleeve tube is shrunk around the glass body formed by deposition, to improve process economies.

Typically, in inside deposition processes, the gas flow into the reaction zone is regulated such that the material deposited onto the inside wall of the substrate tube has a relatively low refractive index (including an index matched to the substrate index), and last-deposited material has a relatively high refractive index. The former material will collectively be referred to as deposited cladding material, the latter as core material. The refractive index of the deposited cladding need not be uniform, and fibers having a multiplicity of deposited cladding regions, including undoped as well as down-doped regions, are known. See, for instance, U.S. Pat. No. 4,439,007. Generally, the amount of deposited cladding material is a significant fraction of the total amount of deposited material, and in single mode, (SM) fiber, the amount of deposited cladding material generally greatly exceeds the amount of core material.

Fibers produced by an outside deposition process also comprise a deposited core and deposited cladding. In many cases they also comprise an outer cladding that is derived from the preexisting sleeve tube.

In SM optical fibers, a significant fraction of the total guided energy is not confined to the core, and the tail of the power distribution extends a considerable distance into the cladding material. Since the substrate or sleeve tube material typically is less pure, and therefore much more lossy, than the deposited cladding material, it is necessary to ensure that no significant fraction of the total power propagates in the substrate- or sleeve-tube-derived material. (Substrate-tube-derived and sleeve-tube-derived material will be referred to collectively as "tube-derived" material.) This is typically achieved by making the layer of deposited cladding material sufficiently thick. For instance, if the deposited cladding is of such a thickness that only $10^{-4}$ of the total power is propagating in the tube-derived material then a substrate (or sleeve) tube having a loss of 100 dB/km would only add 0.01 dB/km absorption loss to the fiber.

In one type of prior art SM fiber, the so-called depressed index cladding fiber, the effective refractive index of the core often does not substantially exceed (typically by less than about 0.5%) that of pure silica, with the effective refractive index of the deposited cladding material being substantially lower than that of the core, and also lower than that of silica. Depressed cladding SM fibers possess several advantageous features. Due to the possibility of using an undoped (or lightly doped) core, such fibers can have low Rayleigh scattering loss. Furthermore, such fibers can be radiation damage tolerant, and can be relatively immune to loss increases due to hydrogen indiffusion.

In prior art fiber with depressed index cladding a further reason exists for having a relatively thick layer of deposited cladding material. If in such fiber a nonnegligible fraction of the total power were to leak to the tube-derived cladding material, the fiber would have relatively high loss, even if the tube-derived material had a low absorption loss, comparable to that of the deposited cladding material. This type of loss is referred to as "leaky mode" loss, since the radiation propagating in the outer cladding is unguided and thus will "leak" away. Similar to absorption loss in the tube-derived cladding, leaky mode loss can be avoided by interposition of a sufficiently thick layer of deposited cladding material between core and tube-derived cladding.

Since depressed index cladding optical fiber offers advantages over other fiber designs, such fiber is of considerable interest. See, for instance, U.S. Pat. No. 4,439,007. The amount of deposited cladding material generally is a significant fraction of the total amount of deposited material in all silica-based optical fiber, but in SM fiber the amount of deposited cladding material typically greatly exceeds the amount of core material. Since deposition time during preform manufacture is a significant cost item in optical fiber production, fiber that requires less deposited cladding material than is necessary for prior art designs is therefore of considerable interest. This application discloses a fiber having tChis and other advantageous features.

DEFINITIONS

An "optical fiber" is a filamentary dielectric body, typically comprising a core having a relatively high refractive index, surrounded by at least one cladding of relatively low refractive index, such that electromagnetic radiation of a predetermined wavelength, the operating wavelength, is longitudinally guided within the body.

The "index of refraction" herein is the index of refraction at a given wavelength, typically the operating wavelength of the fiber.

The "effective" index of refraction of a region of an optical fiber, e.g., the core, or of the tube-derived cladding, is the refractive index of the region in an equivalent fiber having only steplike index variations. See, for instance, A. W. Snyder, *Proceedings of the IEEE*, Vol. 69(1), pp. 6–13 (1981).

The "effective" diameter of a region of an optical fiber, e.g., the core, or the outer diameter of the deposited cladding, is the diameter of the region in the above referred to equivalent fiber.

A "single mode" optical fiber is an optical fiber having operating wavelength (or wavelengths) above the cut-off wavelength of the $LP_{11}$ mode in the fiber. See, for instance, *Optical Fiber Telecommunications*, S. E. Miler and A. G. Chynoweth, editors, pp. 37–62 (1979). The term includes step index as well as graded index fibers.

A "multimode" (MM) optical fiber is an optical fiber which supports at its operating wavelength a multiplicity, typically hundreds, of propagating modes.

Herein glass is produced "in-situ" if it is produced during the preform manufacturing process by means of a glass-forming reaction.

SUMMARY OF THE INVENTION

The instant invention is a silica-based (at least about 80%, 90%, or even 95%, by weight ($SiO_2$) optical fiber of novel design. The fiber comprises a core, deposited (first) cladding surrounding the core, and tube-derived (second) cladding surrounding the first cladding. The second cladding is down-doped, i.e., has an effective index of refraction less than the index of refraction of pure $SiO_2$. Furthermore, the inner diameter of the second cladding is at most about 90% of that of a prior art optical fiber having substantially the same total loss as the inventive fiber at the operating wavelength, and differing from the inventive fiber only in having a second cladding that consists essentially of silica (and, of course, in having the above-referred to larger second cladding inner diameter). The inventive fiber thus comprises at least about 20% less deposited cladding material, preferably at least 50% less, than the equivalent prior art fiber, resulting in a significant reduction of preform deposition time.

The inventive fiber is drawn from a preform by conventional means, the preform having been produced by an internal deposition process, e.g., by MCVD or PCVD, or by an external deposition process, e.g., by VAD or OVD.

In a particular exemplary embodiment of the invention, the effective refractive index of the tubederived cladding is substantially equal to the effective refractive index of the deposited cladding.

Typically, the tube-derived cladding comprises silica and sufficient fluorine and/or boron to result in a lowering of the refractive index of the material by at least about 0.001, preferably at least 0.0025, from that of pure $SiO_2$. For instance, doping $SiO_2$ with 1% by b.w. F results in a material having a refractive index of 1.44158 at a wavelength of 1.3622 $\mu$m. This represents an index reduction of about 0.005. See, for instance, J. W. Fleming et al, *Applied Optics*, Vol. 22, pp. 3102–3104 (1983).

SM fiber according to the invention can have a value of D/d (the ratio of deposited cladding outer diameter to core diameter, or equivalently, of tube-derived cladding inner diameter to core diameter) that is much less than that of fiber that uses an undoped silica substrate tube, thus considerably reducing the preform processing time. Alternatively, SM optical fiber according to the invention having a relatively low value of D/d can have much lower loss, especially at wavelengths above about 0.9 $\mu$m, than prior art fiber having the same relatively low value of D/d, due to the lower leaky mode loss of the inventive fiber.

MM fiber according to the invention can have a lower core doping level, resulting in reduced Rayleigh scattering loss, and also in economic advantages. Alternatively, it permits production of multimode fiber with higher numerical aperture than is possible in prior art fiber.

BRIEF DESCRIPTION OF THE DRAWINGS

The same numerals are used to identify equivalent features in a different figures.

DETAILED DESCRIPTION

Figure 1:
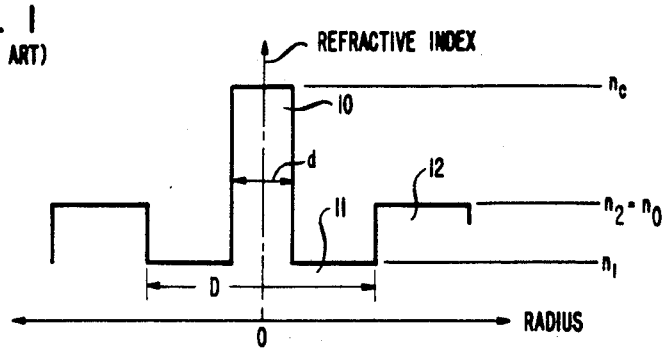
FIGS. 1 and 2 schematically depict the (idealized) refractive index profiles of exemplary prior art SM and MM fibers, respectively.

A principal object of this invention is the reduction of the amount of deposited cladding required in low loss depressed cladding SM optical fibers. A further object of the invention is the reduction of the amount of index-raising dopant, typically Ge, required in MM optical fibers of high numerical aperture (NA), or to make possible production of fibers with high NA. These and other objects are attained by the use of down-doped (effective refractive index less than that of silica) silica subtrate tubes in preform manufacture, resulting in fiber with tube-derived cladding having an effective refractive index that is lower than that of $SiO_2$.

SM optical fiber according to the invention typically comprises at most about 80%, preferably at most about 50%, of the deposited cladding material that would be required in a prior art fiber that differs from the inventive fiber only in comprising undoped silica tube-derived cladding (in addition to, of course, having a larger deposited cladding diameter D). That is to say, the inventive fiber and the prior art fiber with which it is being compared both have the same effective core refractive index $n_c$, the same effective core diameter d, the same effective deposited cladding refractive index $n_1$, use material of the same purity, and of the same intrinsic loss at the operating wavelength of the fiber.

We believe that a 20% reduction in the amount of deposited cladding material can result in a significant cost saving in fiber manufacture, even considering the possibly somewhat higher cost of a down-doped substrate tube. Since it is ultimately our object to improve the economy of fiber production, we believe that SM fiber according to the invention should comprise at least 20% less deposited cladding material (or, substantially equivalently, have D/d at least about 10% smaller) than the equivalent prior art fiber.

Alternatively, SM fiber according to the invention can have substantially lower total loss, typically at least about 1 dB/km less, at the operating frequency than a prior art fiber which differs from the inventive fiber only in comprising undoped silica tube-derived cladding (and, of course, in having a higher loss).

In MM fiber according to the invention, the thickness of the deposited cladding (which in MM fiber is often referred to as the barrier layer) is not necessarily less than it is in equivalent prior art fiber. Instead, the invention can result in cost saving due to a reduction of the amount of costly $GeCl_4$ (or other core dopant) required during core deposition. Alternatively, it makes possible production of higher NA fiber, since multimode fiber according to the invention can have a larger refractive index difference between maximum core index and effective cladding index. Furthermore, lowering the dopant level in the fiber core reduces Rayleigh scattering, and may result in fiber being less susceptible to radiation damage. Use of down-doped silica tube-derived cladding may result in lowered susceptibility of SM as well as MM fibers to hydrogen-induced loss.

Figure 2:
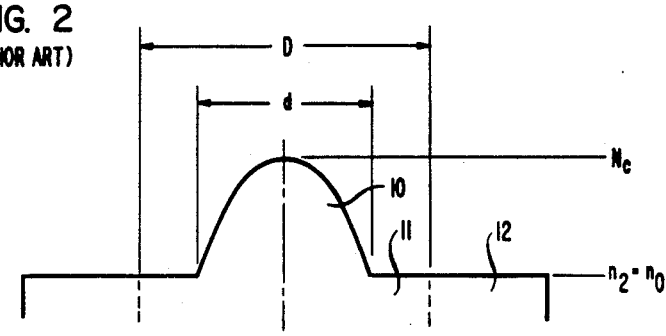

FIGS. 1 and 2 show examples of (effective) refractive index profiles of prior art fibers, in which numeral 10 refers to the core, 11 to the deposited cladding, and 12 to the tube-derived cladding. d is the effective core diameter, D the effective outer diameter of the deposited cladding, $n_c$ is the core effective refractive index, $n_1$ the effective refractive index of the deposited cladding, and $n_0$ the refractive index of $SiO_2$ and of the tube-derived cladding. Coordinate axes are explicitly shown only in FIG. 1. FIGS. 2-6 are to be understood to have the same coordinate axes as FIG. 1.

FIG. 1 exemplifies prior art SM fibers. If $n_1 = n_0$, then the fiber is a matched cladding fiber. If $n_1 < n_0$ then the fiber is a depressed cladding fiber. Fibers having two or more deposited cladding regions, with positive or negative index variations, are known but are not illustrated.

FIG. 2 shows the refractive index profile of an exemplary prior art MM fiber. The index of core 10 varies smoothly from $n_0$ to a maximum value $N_c$, and the deposited cladding 11 is shown to have the same index as the tube-derived cladding 12, namely $n_0$. However, multimode fiber with down-doped barrier layer is known.

Figure 3:
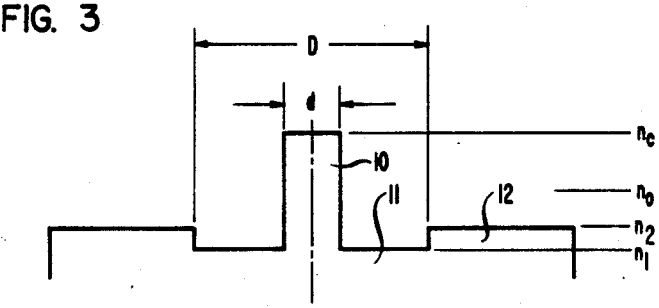
FIG. 3 schematically shows the effective refractive index profile of an exemplary SM fiber according to the invention.

FIG. 3 schematically depicts the (effective) refractive index profile of an exemplary SM fiber according to the invention. The index $n_c$ of core 10 is shown to be greater than $n_0$, the refractive index of $SiO_2$. Although not necessarily so, it is expected that $n_c$ would typically be equal to or larger than $n_0$. Deposited cladding 11 has index $n_1$, and tube-derived cladding 12 had index $n_2$, both of which are less than $n_0$. The value of $n_2$ can in principle be greater than, less than, or equal to that of $n_1$. However, in fibers having a single deposited cladding region, $n_1 \sim n_2$, and $n_1 < n_2$ are the only relationships of practical current significance, with the former being currently a preferred choice.

Figure 4:
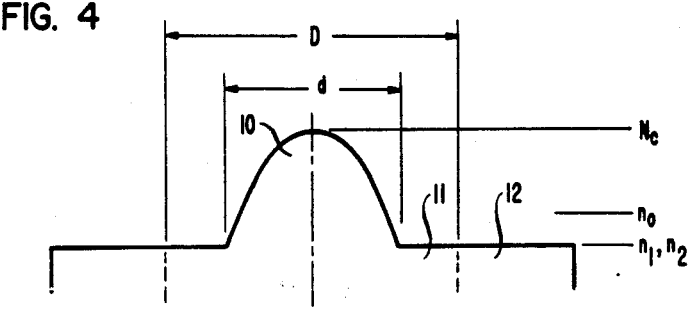
FIG. 4 similarly shows the effective profile of an exemplary MM fiber according to the invention.

FIG. 4 schematically shows the (effective) refractive index profile of an exemplary multimode fiber according to the invention. Core 10 has maximum index $N_c$ greater than $n_0$, and both deposited cladding 11 and tube-derived cladding 12 have refractive indices ($n_1$ and $n_2$, respectively) that are less than $n_0$, with $n_1$ being shown to be equal to $n_2$. However, this equality is not considered to be a necessary requirement.

Figure 5:
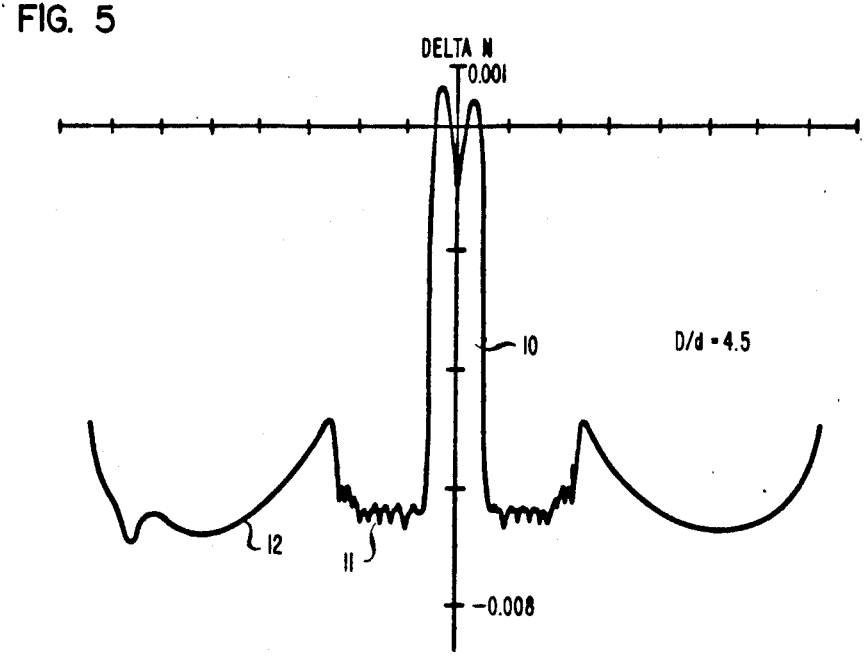
FIG. 5 shows the measured refractive index profile of exemplary fiber according to the invention.

The measured refractive index profile of an exemplary optical fiber preform according to the invention is shown in FIG. 5. Since the index profile of the preform is transferred substantially without change to the fiber drawn from the preform, FIG. 5 can also be considered to show the index profile of an inventive fiber.

Core 10 of the preform of FIG. 5 was formed by depositing essentially pure $SiO_2$, and thus has a refractive index essentially equal to $n_0$, the index of silica. Deposited cladding 11 is down-doped to yield a refractive index lower than $n_0$. In this particular case, the index difference $\Delta n$ ($\Delta n = n_c - n_1$) between core and deposited cladding is about 0.006. The deposited cladding layer is relatively thin, with D/d being about 4.5. The substrate is also down-doped, such that the effective indices of deposited cladding and substrate are substantially equal. The radial variations of the substrate index may be due to dopant burn-off during preform manufacture.

Figure 6:
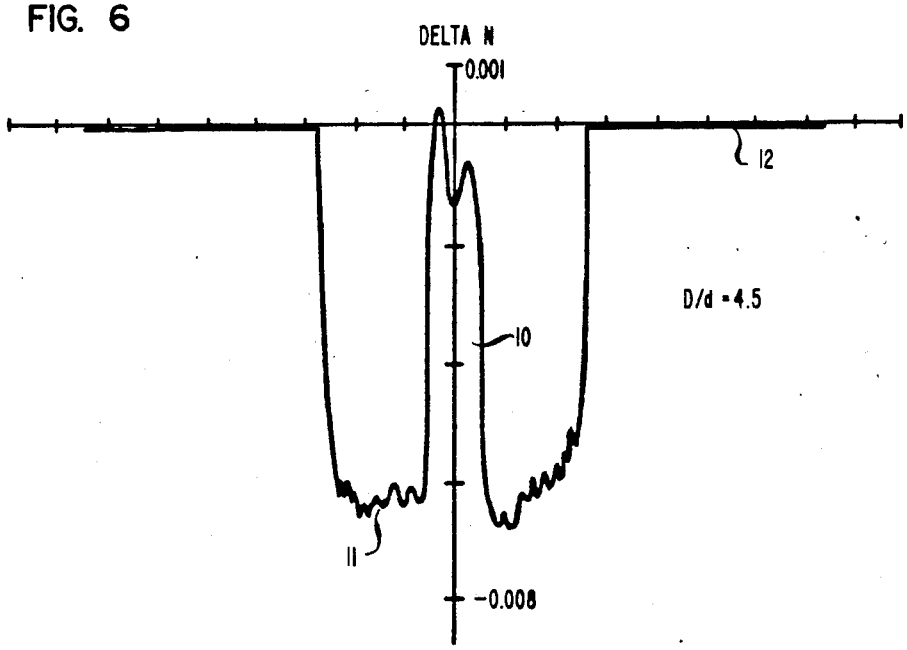
FIG. 6 shows the measured refractive index profile of a fiber that is substantially identical to the fiber of FIG. 5, except for the use of a conventional undoped silica substrate tube.

FIG. 6 shows the measured refractive index profile of a prior art preform that was fabricated by us for purpose of comparison. The preform of FIG. 6 differs from that of FIG. 5 substantially only in the value of the substrate refractive index, with the preform of FIG. 6 using a substantially pure commerically available silica substrate. In particular, the two preforms have essentially the same values of core refractive index, of $\Delta n$, and of D/d.

Figure 7:
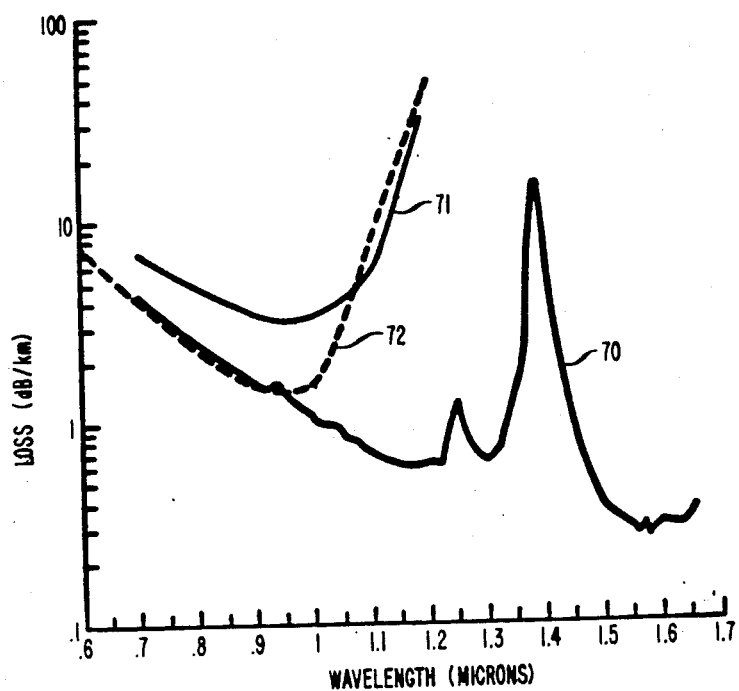
FIG. 7 shows loss data for both the fibers of FIG. 5 and of FIG. 6.

Optical fibers were drawn both from the inventive preform of FIG. 5 and the prior art preform of FIG. 6. The drawing was done in the conventional way, both fibers had the same diameter, and thus were substantially identical except for the different tubederived cladding refractive indices. FIG. 7 shows the measured transmission loss spectra 70 and 71 of the inventive fiber and of the prior art fiber, respectively. As can be seen, the two fibers have similar losses up to about 0.9 $\mu$m, with the prior art fiber being somewhat more lossy. However, for wavelengths greater than 0.9 $\mu$m the losses of the prior art fiber increase rapidly, due largely to macrobending effects. Curve 72 is the calculated loss of a fiber having the same parameters as the prior art fiber, also showing a rapid increase in loss above about 1 $\mu$m.

In prior art fibers the diameter D of the deposited cladding is chosen to insure that (a) the mode power profile is not truncated and propagating light power does not significantly extend into the lossy tube-derived cladding and (b) in depressed index cladding fibers the fundamental ($LP_{01}$) mode is prevented from leaking into the outer cladding. We will now discuss the implications of these two loss mechanisms.

Figure 8:
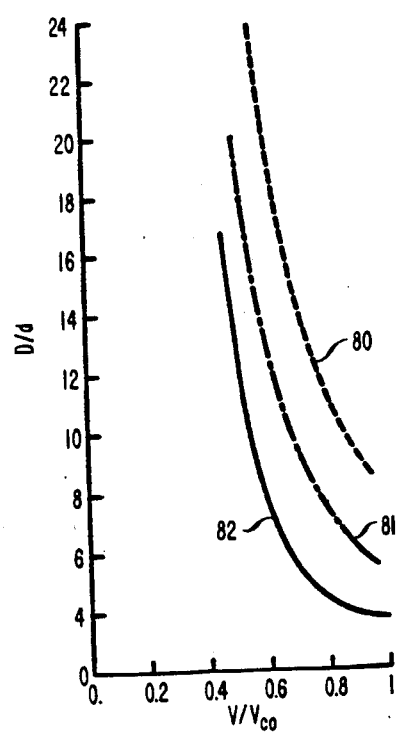
FIG. 8 shows the minimum value of D/d required to maintain the fraction of power propagating in the substrate-derived clad at a value less than $10^{-4}$, as a function of the parameter $V/V_{co}$, for three different fiber designs.

If, for instance, D/d of a fiber is such that the fraction $\bar{P}_s$ of the total light power that travels in the tube-derived cladding is $10^{-4}$, and the tube material has a loss of 100 dB/km, then the contribution of tube material absorption to the total fiber loss is 0.01 dB/km. Curve 82 of FIG. 8 illustrates the value of D/d required to maintain $\bar{P}_s < 10^{-4}$ for SM fiber with matched clad, as a function of the normalized frequency parameter V, with $V = \pi d \lambda^{-1} [n_c^2 - n_1^2]^{\frac{1}{2}} \lambda$ being the wavelength, and d, $n_c$, and $n_1$ being illustrated in FIG. 1. In FIG. 8, V is normalized to $V_{co}$, the cut-off V-number below which the fiber is single mode. For instance, for step-index fiber, $V_{co} = 2.405$. For a discussion of guiding properties of optical fiber, see, for instance, S. E. Miller et al, op. cit. Curve 82 shows that for $V/V_{co} = 1$, D/d could be quite small, about 4, if only absorption loss in the outer cladding is considered.

In depressed-cladding SM fiber, D/d also has to be large enough to prevent leakage of fundamental mode power into the outer cladding. See, for instance, L. G. Cohen et al, *IEEE Journal of Quantum Electronics*, Vol. QE-18, pp. 1467-1472 (1982), incorporated herein by reference. The leakage loss is increased if the fiber contains macrobends. Such bends are, of course, essentially always present in installed fiber, and immunity to macrobending loss is an important goal in fiber design.

Curves 80 and 81 of FIG. 8 gives exemplary values of D/d, as a function of $V/V_{co}$, that will result in macrobending loss of less than 0.01 dB/km for two depressed cladding fibers. It is assumed that the fiber has a constant radius of curvature of 7.5 cm. In this case the added loss is less than 0.01 dB/km if the fraction of power in the tube-derived cladding is less than $10^{-11}$ and $10^{-7}$, for $SiO_2$-core, and for a particular choice of $SiO_2$-$GeO_2$-core, depressed index SM fiber, respectively. Curve 81 shows the required D/d for an exemplary prior art depressed cladding SM fiber with up-doped core ($SiO_2$-$GeO_2$), and curve 80 for a prior art depressed cladding SM fiber with undoped ($SiO_2$) core. The curves show that in the former case D/d has to be at least about 6.5, and in the latter case at least about 9, for $V/V_{co} = 1$. For $V/V_{co} = 0.6$, the latter requires a D/d of about 20.

The theory on which the curves of FIG. 8 are based offers a further way of stating the fact that SM fibers according to the invention have a smaller outer diameter of deposited cladding than prior art fiber. Using equation 9 of L. G. Cohen et al, op. cit. (which applies to straight fiber as well as to curved fiber), it is possible to compute the radiation loss of any SM fiber of a type relevant to this application. Thus, one can compute the radiation loss coefficient $2\alpha$ of a prior art test fiber having tube-derived cladding effective refractive index $n_2 = n_0$, and also having tube-derived cladding effective inner diameter $D = 2b$). This quantity is to be denoted $2\alpha(n_2 = n_0, 2b)$. One can similarly compute the radiation loss coefficient for the fiber that is to be compared with the test fiber, namely, the fiber having a depressed index outer cladding. That fiber thus has $n_2 < n_0$, and a tube-derived cladding inner diameter D that can be expressed as $D = 1.8b$. This quantity will be written $2\alpha(n_2 < n_0, D = 1.8b)$. Wherever $n_0$ appears in equation 9, the actual value of the tube-derived cladding effective refractive index ($n_2$) is to be used. All other parameters are the same in both calculations. The notation is fully explained in the reference.

If $2\alpha(n_2 < n_0, D = 1.8b) \leqq 2\alpha(n_2 = n_0, 2b)$ then the fiber to be compared has equal or lower radiation loss than the prior art fiber with larger D against which it is being tested, and the fiber to be tested is thus shown to be a fiber according to the invention.

Stated differently, one can determine the same loss coefficient $2\alpha(n_2 < n_0, D = 1.8b)$ of the first fiber for a given radius of curvature R, and can compare it to $2\alpha(n_2 = n_0, 2b)$ of the above referred to test fiber for the same radius of curvature R. For simplicity, these macrobending power loss coefficients can be referred to as $2\alpha(R)$ and $2\alpha_2(R)$, respectively. As discussed above, the inner diameter of the second cladding of the first fiber is D, and the inner diameter of the second cladding of the test fiber therefore is D/0.9. This is the only difference between the two fibers, except that the second cladding refractive index $n_2$ of the first fiber is at least 0.001 less than $n_0$, whereas the second cladding refractive index of the test fiber is $n_0$.

The above discussion illustrates the observation that depressed cladding optical fiber requires a relatively thick deposited cladding and is therefore expensive to fabricate. On the other hand, such fiber has substantial advantages, such as lower Rayleigh loss. Further possible advantages of such fiber are radiation hardness, and decreased susceptibility to increased loss due to hydrogen indiffusion.

Since leaky mode losses typically decrease as the depth of the index depression decreases, vanishing as the index depression disappears, use of a down-doped substrate tube reduces leaky mode loss, and can eliminate it if the effective refractive indices of the tube-derived cladding and the deposited cladding are equal, or if the former is less than the latter.

The invention can be practiced with a silica-comprising substrate or sleeve tube whose index of refraction has been decreased by any suitable method. Typically, it is practiced with a silica tube that has been down-doped, typically with fluorine and/or boron. Other elements could be incorporated into the tube material for purposes other than index-modification, e.g., to prevent hydrogen indiffusion.

Although any method for forming a down-doped substrate or sleeve tube is contemplated, methods that comprise sintering of a porous silica-rich body, to thereby form a silica-rich glass body, appear to us currently to be the most advantageous ones. One reason for this opinion is the ease with which dopants such as fluorine or boron can be incorporated into the porous material prior to or during sintering.

Among such methods are sol-gel methods, such as are described in U.S. Pat. No. 4,419,115. See also U.S. patent application Ser. No. 564,181, filed Dec. 22, 1983 (still pending), in which it is disclosed that incorporation of fluorine into a porous silica body reduces the tendency for bubbles to remain in the glass formed therefrom by sintering. A further gel method, combining the alkoxide method and the colloidal particle method, that can be advantageously used in the practice of the invention, is disclosed in U.S. Pat. No. 4,605,428. In all methods that appear currently of interest the dopant can be introduced prior to the formation of the dense glass body, thereby limiting the required dopant diffusion distance to the order of the particle size.

EXAMPLE I

An MCVD substrate tube was prepared by a method substantially as described in E. M. Rabinovich et al, *Journal of Non-Crystalline Solids*, Vol. 63, pp. 155–161 (1984), incorporated herein by reference. Briefly, fumed silica (Cab-O-Sil M5, Cabot Corporation, Boston, Massachusetts) and water were mixed in the ratio 40:100 by weight, the resulting sol was gelled, dried, and heat treated at 900° C. Fragments of the dried porous material were redispersed with $H_2O$ at a ratio of 55 parts b.w. of $SiO_2$ to 100 parts of $H_2O$. The thus formed sol was cast into a mold made of concentric $SiO_2$ glass tubes 50 cm long. The internal diameter of the outer tube was nominally 3.8 cm, the outside diameter of the inside tube 2.7 cm. A gel was formed in the annular space between the tubes, the tubes were removed, and the gel dried in ambient air, resulting in a porous silica tube of about 25% of theoretical density. This tube was further dehydrated by maintaining the tube at 1000° C. for 16 hours in an atmosphere of He-3% $Cl_2$ (by volume). This treatment is known to reduce the OH-concentration to less than 1 ppm. The dehydration was followed by fluorine treatment for 3 hours in He-2% $SiF_4$ (by volume), also at 1000° C., and consolidation in the same atmosphere, increasing the temperature to 1300° C. at 200° C./hour. This resulted in essentially uniform shrinkage of the tube, without distortion, to greater than 99% of theoretical density. The thus produced F-doped silica glass tube was joined on both ends to commerical silica tubes, the assembly mounted in a conventional MCVD lathe, and fire polished in He-$SiF_4$ at 1900° C. to smooth the inner wall. Next $SiO_2$-F/P cladding material was deposited at 1800° C., using $SiCl_4$, $POCl_3$, $SiF_4$, $O_2$, and He, by a standard MCVD technique. This was followed by deposition of the core material by the same technique, using $GeCl_4$, $SiCl_4$, $O_2$, and He, and collapse of the assembly. The index profile of the thus formed preform was determined by the refracted angle method. It is shown in FIG. 5 herein. The rise in index at the deposited cladding tube interface may result from fluorine loss during fire polish. Fiber was drawn from the preform, and the loss spectrum of the fiber determined. The spectrum is shown in FIG. 7, curve 70. The fiber had D/d of 4.5, and had a minimum loss at about 1.55 $\mu m$ of about 0.3 dB/km. Similar fiber having pure $SiO_2$ tube-derived cladding had a loss that greatly exceeded that of the exemplary inventive fiber above about 0.9 $\mu m$.

EXAMPLE II

A boron and fluorine-doped substrate tube was produced by a sol-gel process. 40 gm $SiO_2$ was added to 100 gm $H_2O$ and mixed in a blender. The resulting gel was dried at 150° C., and heat treated at 900° C. for 4 hours. 150 gm of the resulting porous $SiO_2$ was added to 203.5 gm of $H_2O$, along with 59.2 gm of a 4.5 weight percent aqueous $H_3BO_2$ solution. This gives 1 weight percent $B_2O_3$, based on the weight of $SiO_2$. The mixture was blended, poured into a 1 liter glass milling jar with 600 gm of $\frac{1}{2}$ inch $\times \frac{1}{2}$ inch cylindrical $SiO_2$ milling media, and 1.5 gm HF was added (giving about 0.5 weight percent F, based on $SiO_2$ weight). This was milled for about 20 hours, the sol was cast into tube molds and allowed to gel. The gel was then removed from the mold, dried, and sintered, substantially as described before. The resulting F/B-doped silica tube was used as substrate tube for an MCVD-produced preform, from which a fiber was then drawn. Standard and well-known procedures were used for these steps. The resulting fiber has a down-doped tube-derived cladding, and has a loss of about 0.65 dB/km at 1.15 $\mu m$.

What is claimed is:

1. Multimode optical fiber comprising a core, at least a first cladding surrounding the core and being in intimate contact therewith, and a second cladding surrounding the first cladding, the core and the first cladding consisting essentially of glass produced in-situ by means of a glass-forming reaction, the second cladding being the outermost glass portion of the optical fiber and consisting essentially of glass derived from a preexisting tube comprising silica as a major constituent, the second cladding having an effective refractive index $n_2$, characterized in that the second cladding comprises at least one index-lowering dopant, and the effective refractive index $n_2$ is at least 0.001 less than the refractive index of essentially pure silica.

2. Multimode optical fiber of claim 1, wherein the at least one index-lowering dopant is chosen from the group consisting of boron and fluorine.

3. Multimode optical fiber of claim 1, wherein the preexisting tube is produced by a process comprising sintering a porous silica-comprising body, whereby a glass body is formed from the porous body.

4. A silica-based first single mode optical fiber comprising a core, a first cladding contactingly surrounding the core, and a second cladding surrounding the first cladding, the core and the first cladding consisting essentially of glass produced in-situ by means of a glass-forming reaction, the second cladding being the outermost glass portion of the fiber and consisting essentially of glass derived from a pre-existing tube, the first and second cladding having a refractive index $n_1$ and $n_2$, respectively, the fiber having an effective core diameter d and a second cladding inner diameter D, characterized in that (a) the second cladding comprises at least one index-lowering dopant such that $n_2$ is at least 0.001 less than $n_0$, the refractive index of essentially pure silica glass, with $n_1 \leq n_2$.

5. The first optical fiber of claim 4, wherein the value of D/d is at most 90% of the value of $D_1/d$ of a first test fiber that is essentially identical with the first optical fiber (including having the same macrobending loss at the operating wavelength) except that $D_1$, the inner diameter of the second cladding of the first test fiber, is greater than D, and that the refractive index of the second cladding of the first test fiber is equal to $n_0$.

6. First optical fiber of claim 5, wherein D of the first optical fiber is at most about 70% of $D_1$.

7. The first optical fiber of claim 4, associated with the first optical fiber being a macrobending power loss coefficient $2\alpha(R)$ that is less than a macrobending power loss coefficient $\alpha_2(R)$ associated with a second test fiber, where R is the radius of curvature associated with both the first optical fiber and the second test fiber, the second test fiber being essentially identical with the first optical fiber except that the inner diameter of the second cladding of the second test fiber is equal to D/0.9, and that the refractive index of the second cladding of the second optical fiber is equal to $n_0$.

8. First optical fiber of claim 4, wherein the preexisting tube was produced by a process comprising sintering a porous silica-comprising body, whereby a glass body is formed from the porous body.

9. First optical fiber of claim 4, wherein the at least one index-lowering dopant is chosen from the group consisting of boron and fluorine.

10. First optical fiber of claim 2, wherein the in-situ provided glass was produced by means of an inside deposition process.

11. First optical fiber of claim 2, wherein the in-situ produced glass was produced by means of an outside deposition process.

12. First optical fiber of claim 2 wherein $n_2$ is substantially equal to $n_1$.

* * * * *